US008698335B2

(12) United States Patent
Dai et al.

(10) Patent No.: US 8,698,335 B2
(45) Date of Patent: Apr. 15, 2014

(54) LOW COST CURRENT SOURCE CONVERTERS FOR POWER GENERATION APPLICATION

(75) Inventors: Jingya Dai, Toronto (CA); Navid R. Zargari, Cambridge (CA); Bin Wu, Toronto (CA); David Dewei Xu, Pickering (CA); Jiacheng Wang, Toronto (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 618 days.

(21) Appl. No.: 12/819,878

(22) Filed: Jun. 21, 2010

(65) Prior Publication Data

US 2011/0310642 A1    Dec. 22, 2011

(51) Int. Cl.
*F03D 9/00* (2006.01)
*H02P 9/04* (2006.01)

(52) U.S. Cl.
USPC .................................. 290/44; 290/55; 322/44

(58) Field of Classification Search
USPC .................................. 290/44, 55; 322/44, 89
See application file for complete search history.

(56) References Cited

U.S. PATENT DOCUMENTS

| | | | | |
|---|---|---|---|---|
| 4,841,429 A * | 6/1989 | McClanahan et al. | ........ | 363/126 |
| 6,166,929 A * | 12/2000 | Ma et al. | .......................... | 363/37 |
| 7,545,052 B2 * | 6/2009 | Llorente Gonzalez et al. | . | 290/44 |
| 7,990,097 B2 * | 8/2011 | Cheng et al. | .................... | 318/800 |
| 8,044,631 B2 * | 10/2011 | Dai et al. | ...................... | 318/800 |
| 8,174,138 B2 * | 5/2012 | Castelli Dezza et al. | ........ | 290/44 |
| 8,301,311 B2 * | 10/2012 | Nelson | ........................... | 700/287 |
| 2003/0227172 A1 * | 12/2003 | Erdman et al. | ................... | 290/44 |
| 2004/0119292 A1 * | 6/2004 | Datta et al. | ........................ | 290/44 |
| 2005/0012339 A1 * | 1/2005 | Mikhail et al. | ................... | 290/44 |
| 2007/0040386 A1 * | 2/2007 | Shiota | .............................. | 290/44 |
| 2007/0211501 A1 * | 9/2007 | Zargari et al. | .................... | 363/39 |
| 2009/0096211 A1 * | 4/2009 | Stiesdal | ........................... | 290/44 |
| 2009/0267347 A1 * | 10/2009 | Abatemarco | .................... | 290/43 |
| 2011/0019452 A1 * | 1/2011 | Shinomoto et al. | ............ | 363/126 |

OTHER PUBLICATIONS

Tenca et al., "Current Source Topology for Wind Turbines With Decreased Mains Current Harmonics, Further Reducible via Functional Minimization", IEEE Transactions on Power Electronics, vol. 23, No. 3, May 2008.

Tenca et al., "Wind Turbine Current-Source Converter Providing Reactive Power Control and Reduced Harmonics", IEEE Transactions on Industry Applications, vol. 43, No. 4, Jul./Aug. 2007.

* cited by examiner

*Primary Examiner* — Julio C. Gonzalez
(74) *Attorney, Agent, or Firm* — Amin, Turocy & Watson, LLP

(57) ABSTRACT

A system comprising low cost topology for power converter systems is provided. The system takes advantage of the voltage-boost characteristic of a current source inverter (CSI) and utilizes a PWM CSI as a grid-side converter for power generation systems. Moreover, the generator-side converter employs low-cost devices, such as, but not limited to diode bridge, thyristor bridge, and/or a combination of diodes and thyristors, and accordingly simplifies generator-side converter and control. Further, the system provides a wider range of operation than traditional voltage source converter based topologies that utilize a voltage source inverter (VSI) as the grid-side convertor along with a diode rectifier as the generator-side converter.

20 Claims, 13 Drawing Sheets

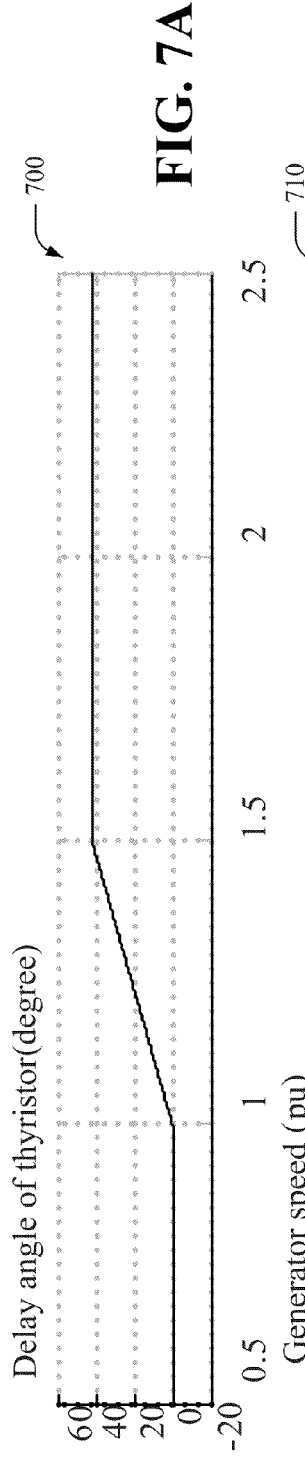
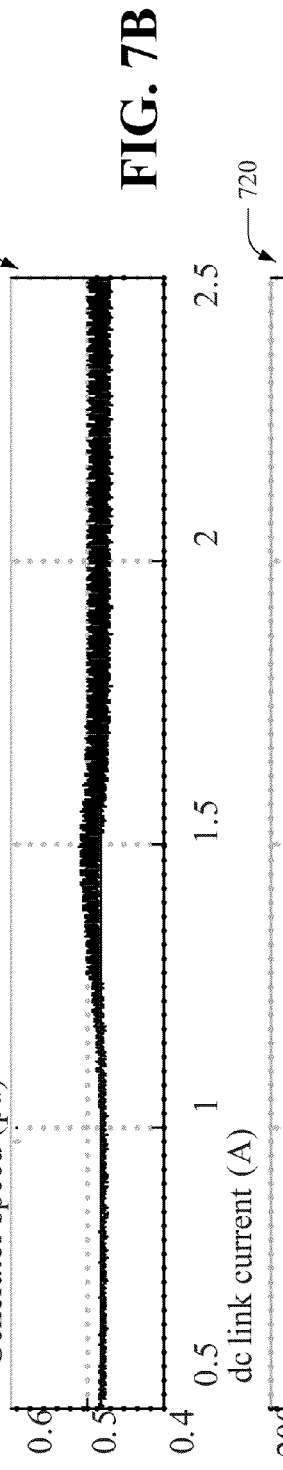
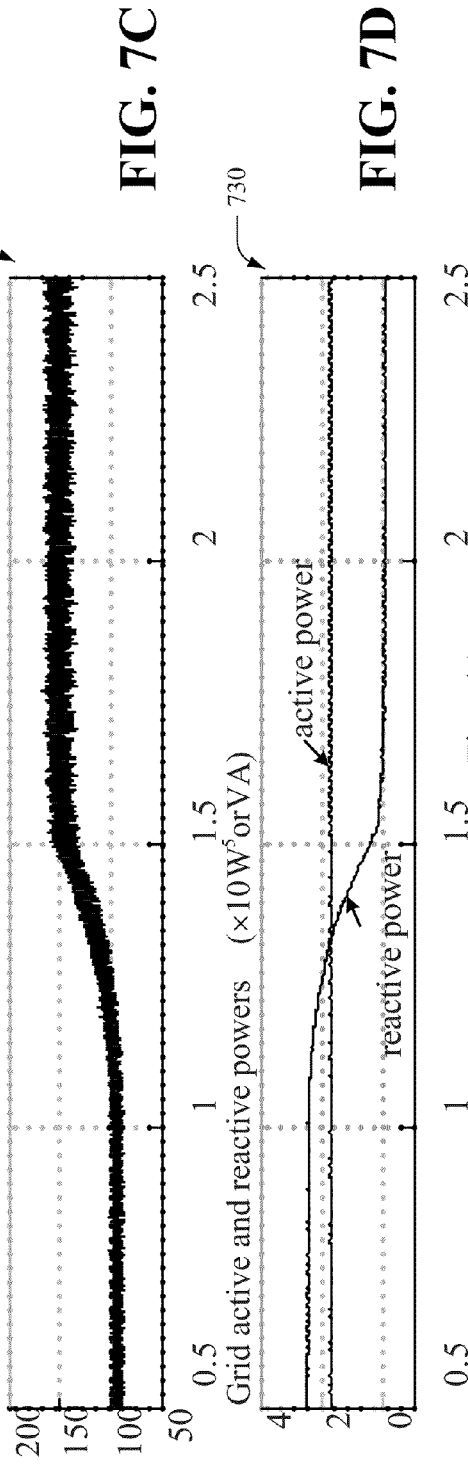
FIG. 7A
FIG. 7B
FIG. 7C
FIG. 7D

LOW COST CURRENT SOURCE CONVERTERS FOR POWER GENERATION APPLICATION

TECHNICAL FIELD

The subject disclosure relates to converter topologies and power conversion systems, more particularly, to a low cost and low complexity power converter system for power generation applications.

BACKGROUND

Traditional energy sources (e.g., oil, natural gas, and coal) are limited, non-renewable and depleting rapidly. Thus, utilization of renewable energy sources such as wind energy, fuel cell, solar energy, etc. has gained importance. Wind based energy conversion systems for providing wind-generated power to electrical power grids are currently experiencing tremendous growth and increased popularity. In particular, wind energy conversion systems convert the kinetic energy of wind into electricity or other forms of energy. Moreover, utilization of wind power is a fast growing power generation technology, which has been recognized as an environmentally friendly means of power generation.

The major components of a typical wind energy conversion system (WECS) include a wind turbine, generator, interconnection apparatus and control systems. Typically, traditional systems include synchronous generators, permanent magnet synchronous generators, and/or induction generators (e.g., squirrel cage type and wound rotor type generators for wind turbines). Further, the interconnection apparatus includes power electronic converters that can achieve power control, soft start and interconnection functions. Generally, both voltage source converters (VSC) and current source converters (CSC) can be used in a WECS.

Various traditional topologies are available for VSC and CSC based WECSs. Typically, VSC based topologies include an interconnection system comprising a diode rectifier, a boost converter and a Pulse Width Modulated (PWM) Voltage Source inverter (VSI), or an interconnection system comprising a diode rectifier with a PWM VSI, or an interconnection system comprising back to back PWM VSIs. Further, traditional CSC based topologies include an interconnection system that employs a diode rectifier and a phase-controlled thyristor inverter, or an interconnection system that employs back-to-back phase-controlled thyristor based converters, or an interconnection system that employs back-to-back PWM CSCs. However, most traditional topologies involve a number of expensive active semiconductor devices, utilized within a generator-side converter. In other traditional topologies, which employ a diode rectifier with a PWM VSI, a voltage-boost circuit is utilized that can add to the cost and complexity of the system and control.

SUMMARY

The following presents a simplified summary in order to provide a basic understanding of some aspects of the disclosed innovation. This summary is not an extensive overview, and it is not intended to identify key or critical elements or to delineate the scope of the invention. Its sole purpose is to present some concepts in a simplified form as a prelude to the more detailed description presented later.

The voltage-boost characteristic of a current source inverter (CSI) is in accordance with the nature of a wind energy conversion system (WECS). In view of this, a low cost topology for wind power generation applications utilizing a diode and/or phase-controlled thyristor rectifier with pulse width modulated (PWM) CSI is disclosed herein. Moreover, low cost devices, such as, but not limited to a diode bridge, a thyristor bridge, or a combination of diodes and thyristors is utilized as a generator-side converter and a PWM CSI is employed as a grid-side converter.

In one aspect, a low cost topology for power generation applications is disclosed herein. In particular, the disclosed power generation system includes a generator (e.g., permanent magnet synchronous generator) to convert kinetic energy into electric energy. The generated electric energy is converted to a direct current (DC or dc) current by employing a diode rectifier, a thyristor rectifier and/or a circuit comprising combination of diodes and thyristors. The dc current is passed through a dc link, for example, an inductor, prior to providing the dc current as input to a PWM CSI. The PWM CSI generates a fixed frequency and/or voltage output that can be delivered to a utility grid.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIGS. 7A-7D illustrate example waveforms for a WECS that employs a phase-controlled thyristor rectifier and a PWM CSI for power conversion.

DETAILED DESCRIPTION

Figure 1:
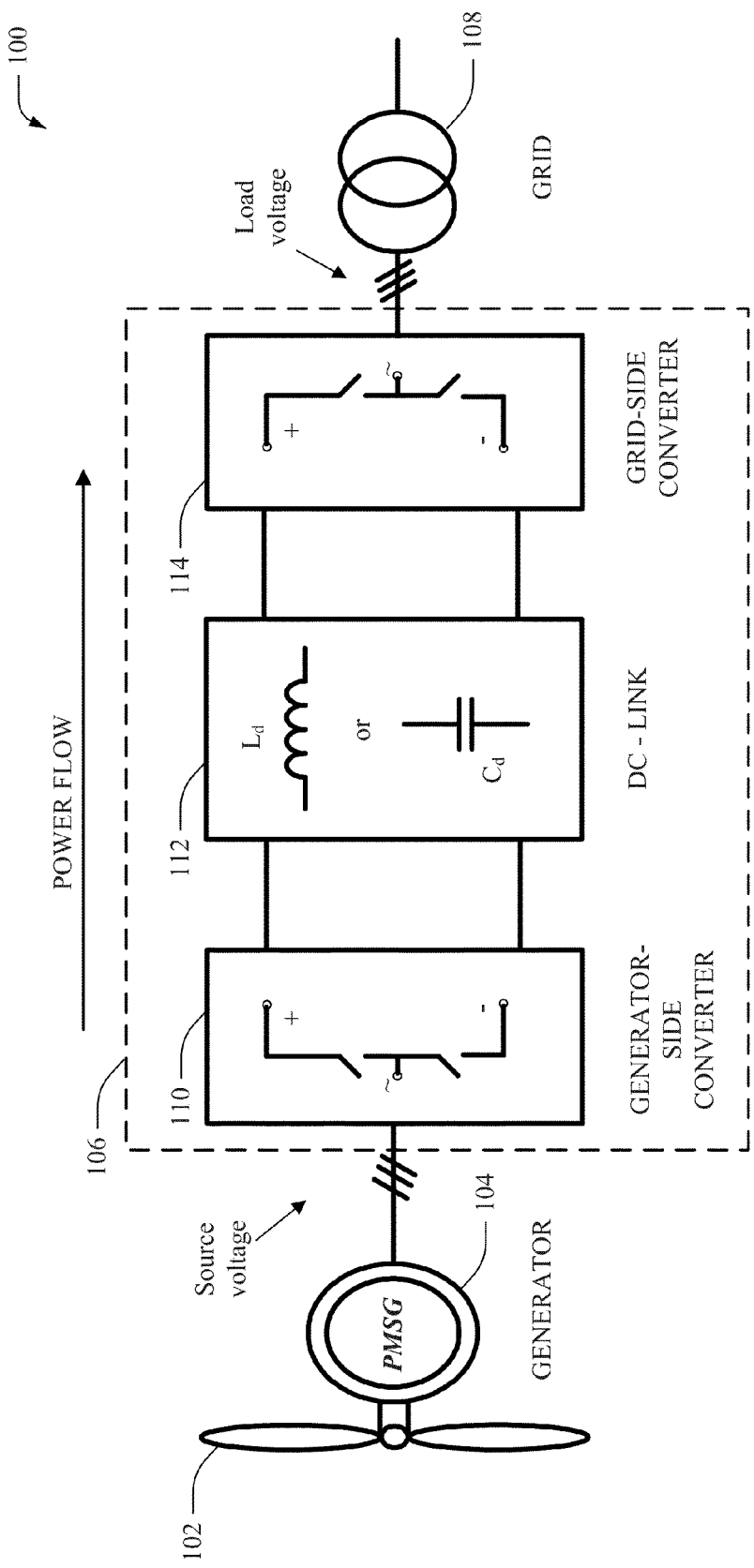
FIG. 1 illustrates a simplified block diagram of a full power converter based wind energy conversion system (WECS) in accordance with an aspect of the subject specification.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component," "system," "equipment," "interface", "network," "device," "circuit," and/or the like are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer, an industrial controller, a relay, a sensor and/or a variable frequency drive. By way of illustration, both an application running on a server and the server can be a component. One or more components can reside within a process and/or thread of execution, and a component can be localized on one computer and/or distributed between two or more computers.

In addition to the foregoing, it should be appreciated that the claimed subject matter can be implemented as a method, apparatus, or article of manufacture using typical programming and/or engineering techniques to produce software, firmware, hardware, or any suitable combination thereof to control a computing device, such as a variable frequency drive and controller, to implement the disclosed subject matter. The term "article of manufacture" as used herein is intended to encompass a computer program accessible from any suitable computer-readable device, media, or a carrier generated by such media/device. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave generated by a transmitter can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Wind power conversion systems have experienced tremendous growth, due to wind power's environmental benefits, technological advance, and government incentives. The systems and method disclosed herein provide low-cost and simple-design power converter systems for power generation applications with a reasonable operating range. It can be appreciated that although the embodiments disclosed herein relate to an example wind energy conversion system (WECS), the subject specification is not so limited and that the disclosed embodiments can be implemented in most any power conversion systems (e.g., hydro turbines).

Referring to the drawings, FIG. 1 illustrates a simplified block diagram of full power converter based wind energy conversion system 100 in accordance with an aspect of the subject specification. A variable-speed wind energy conversion system (WECS) 100, depicted in FIG. 1, is essentially most any electric drive working in the regenerative mode. Typically, the WECS can include a wind turbine 102, a generator 104, interconnection apparatus 106 and a grid 108. Moreover, the wind turbine 102 can be a vertical axis type and/or the horizontal axis type wind turbine. Further, most any number of blades can be employed by the wind turbine 102 (e.g., two or three blades) and the wind turbine 102 can operate down-wind and/or up-wind.

Although a permanent magnet synchronous generator (PMSG) 104 is shown in the figure, it can be appreciated that the subject disclosure is not so limited and most any type of generator can be utilized. For example, an electrical excited synchronous generator (EESG) can also be employed with the disclosed topology. Compared to a PMSG, the utilization of an EESG offers an additional freedom of excitation control that can help to improve the grid-side power factor at low wind speeds. Typically, PMSGs and/or squirrel cage induction generators can be utilized with small to medium power wind turbines due to their reliability and cost advantages. From all the generators that are traditionally employed in wind turbines the PMSGs have the highest advantages since they are stable and secure during normal operation and they do not require an additional DC supply for an excitation circuit. In an example, the PMSG 104 can convert the mechanical power output of the wind turbine 102 into electrical power for the grid 108. Further, an interconnection apparatus 106 can be employed to achieve power control, soft start and/or most any interconnection functions. In one example, the interconnection apparatus 106 can provide a fixed voltage and fixed frequency output with a high power quality.

Referring back to FIG. 1 where a typical full-power converter based WECS 100 is illustrated, the real power flows from the generator 104 to the grid 108 via the interconnection apparatus 106. Moreover, the source voltage of the system 100 is the generator terminal voltage which varies (e.g., in frequency and/or magnitude) with the rotor speed and/or magnetic flux; under variable-speed operation, the source voltage can take any value from zero to the rated voltage of the machine. The output of the interconnection apparatus 106 is connected to the high-voltage grid 108 via a step-up transformer (not shown). Therefore, the magnitude of the load voltage is fixed by the grid 108 and is normally higher than that of the source voltage. As an example, the load voltage can have a fixed magnitude and a fixed and/or variable frequency. Although the embodiments disclosed herein indicate that load voltage is higher than source voltage, it can be appreciated that load voltage can be equal to or less than source voltage.

According to an embodiment, the interconnection apparatus 106 can include generator-side converter 110, a direct current (dc)-link 112, and a grid-side converter 114. In one aspect, the dc-link 112 can provide a circuit that can generate a smooth dc current for operation. Moreover, the dc-link 112 can be most any inductor (e.g., a single inductor, a split inductor, a common-mode choke, etc.). In another aspect, the grid-side converter 114 can be a current source inverter (CSI) which converts the dc-link current to three-phase alternating current (ac or AC) currents acceptable by the grid 108. Contrary to voltage source inverters (VSI), employed in traditional systems, which are voltage-buck converters, CSIs are by nature voltage-boost converters and thus are well suited for full-power converter based WECS. The inherent voltage-boost feature offers the CSIs more flexibility to be combined with different types of generator-side converters 110, leading to configurations that can provide wider system operating ranges than the ranges provided by traditional systems that employ VSI based converters at grid-side and diode rectifiers at the generator-side.

As an example, various CSC topologies can be utilized for the interconnection apparatus 106, including utilizing a pulse width modulation (PWM) CSI or a thyristor converter as a grid-side converter; and a diode rectifier, or thyristor converter, or PWM current source rectifier (CSR) as a generator-side converter. The selection of the topology can depend on the system requirements and/or overall performance. In one example low cost topology, the generator-side converter 110 can include a diode and/or phase-controlled thyristor rectifier circuit to generate a dc current, while the grid-side converter 114 can include a PWM CSI. This example topology has a simple structure and provides a wider range of operation than conventional interconnection apparatus that employ a grid-side diode rectifier circuit and generator-side PWM VSI circuit, and thus can be adopted in large WECSs. In particular, the generator-side converter 110 can employ low-cost devices such as diode bridge, thyristor bridge, and/or a combination of diodes and thyristors, and thus provide simplified and low-cost generator-side converter and control.

Figure 2A:
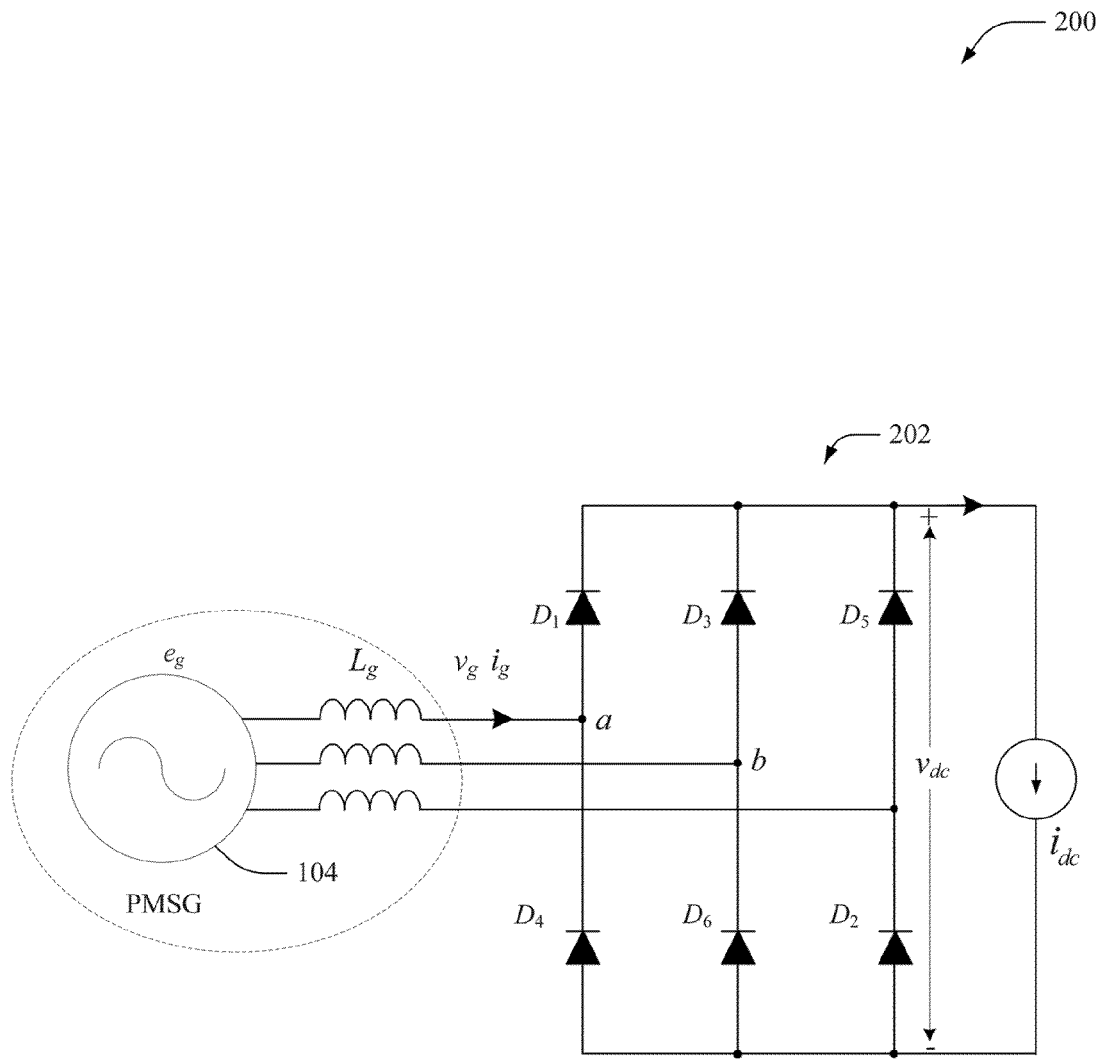
FIG. 2A illustrates an example system that includes a three-phase diode rectifier connected to a permanent magnet synchronous generator (PMSG) for power generation.

Referring now to FIG. 2A, there illustrated is an example system 200 that includes a diode rectifier 202 connected to a PMSG 104, according to an aspect of the subject disclosure. Typically, inherent voltage-boost characteristics of a CSI are in accordance with the nature of a WECS. Accordingly, a low cost topology using a diode rectifier 202 (and/or phase-controlled thyristor bridge (not shown)) with a PWM CSI can be utilized for wind power generation applications. According to one embodiment, a three-phase diode rectifier 202, which includes diodes $D_1$ to $D_6$, can be employed as a generator-side converter in the WECS.

The PMSG 104 is simplified as a voltage source e.g., with finite source inductance $L_g$, which represents the back-electromagnetic field (EMF) and the synchronous inductance, respectively. The load at the dc-link can be viewed as a voltage source or a current source. The theoretical power factor (PF) at the input of the diode rectifier can be 0.955. Due to the large input line inductance $L_g$, the current commutations in the rectifier are not instantaneous and can cause voltage drops at the dc output. The commutation angle as well as the resultant voltage drop depends on $L_g$ and the dc current $I_{dc}$. If the commutation angle is less than 60° of the input fundamental frequency, the voltage loss caused by commutation can occur six times per fundamental cycle and the average dc output voltage can be calculated as follows:

$$V_{dc} = \frac{3\sqrt{2}}{\pi} E_{g,LL} - \frac{3}{\pi} \omega_g L_g I_{dc} \quad (1)$$

Further, the commutation angle δ can be deducted by, $$\cos\delta = 1 - \frac{\sqrt{2}\,\omega_g L_g I_{dc}}{E_{g,LL}}, (0° \leq \delta \leq 60°) \quad (2)$$

Where, $E_{g,LL}$ is the line-to-line magnitude of $e_g$.

Based on the equations supra, it is clear that the longer time the commutation takes, the more voltage drop the dc output can suffer. For example, if the commutation angle increases and exceeds 60°, the decrease of the dc voltage can be more rapid until it drops to zero. Rectifier input PF can decrease as well and the generator currents can increase substantially. This mode of operation is unreasonable and is typically avoided. For obtaining the maximum power from changing wind speed, the generator speed can be adjusted to an optimum value. Since, the diode rectifier does not offer control freedom, the generator-side control can be implemented by varying the de-link current or voltage. According to wind turbine characteristics, the power input from a particular wind speed peaks when the generator is operated at a corresponding optimum speed. The relations of the wind speed ($v_{wind}$) to the optimum generator speed ($\omega_{g,opt}$), electrical torque ($T_{eg,opt}$) and power ($P_{g,opt}$) can be expressed in as follows, $$\omega_{g,opt} \propto v_{wind}$$

$$T_{eg,opt} \propto v^2_{wind}$$

$$P_{g,opt} \propto v^3_{wind} \quad (3)$$

Assuming that the maximum power is obtained. Neglecting the losses in the generator and diode rectifier, the dc-link power $P_{dc}$ is equal to the generated electrical power.

$$P_{dc} = V_{dc} I_{dc} = P_{g,opt} \quad (4)$$

Substituting (1) into (4), $$\left(\frac{3\sqrt{2}}{\pi} E_{g,LL} - \frac{3}{\pi} \omega_{g,opt} L_g I_{dc}\right) I_{dc} - P_{g,opt} = 0 \quad (5)$$

The dc-link current can be calculated by solving the above equation, as follows:

$$I_{dc} = \frac{-k_1 \pm \sqrt{k_2}}{-2k_3} = (k_1 \mp \sqrt{k_2})/2k_3, \quad (6)$$

Where, $$k_1 = \frac{3\sqrt{2}}{\pi} E_{g,LL} > 0 \quad (7)$$

$$k_2 = \left(\frac{3\sqrt{2}}{\pi} E_{g,LL}\right)^2 - \frac{12}{\pi} \omega_{g,opt} L_g P_{g,opt}$$

$$k_3 = \frac{3}{\pi} \omega_{g,opt} L_g > 0$$

In the above equation (7), the value of $k_2$ depends on the system parameters. If $k_2<0$, $I_{dc}$ does not have a real solution, which means the maximum power point may not be achieved.

Therefore, in order to realize maximum power point tracker (MPPT) in a parameter constraint for the synchronous generator can be satisfied, $$E_{g,LL}^2 \geq \frac{2\pi}{3}\omega_{g,opt}L_g P_{g,opt} \qquad (8)$$

Equation (8) implies that, for a given operating speed and power, a minimum required value which depends on the synchronous inductance exists for the back-EMF of the PMSG. For generators having larger synchronous inductances, the flux of the generator can be larger to ensure proper power output. Moreover, if $k_2>0$, then $\sqrt{k_2}=\sqrt{k_1^2-12\omega_{gopt}L_g P_{g,opt}/\pi}<k_1$. Therefore, both solutions in (6) are positive, while $I_{dc1}=(k_1-\sqrt{k_2})/2k_3$ is less than $I_{dc2}=(k_1+\sqrt{k_2})/2k_3$.

Figure 2B:
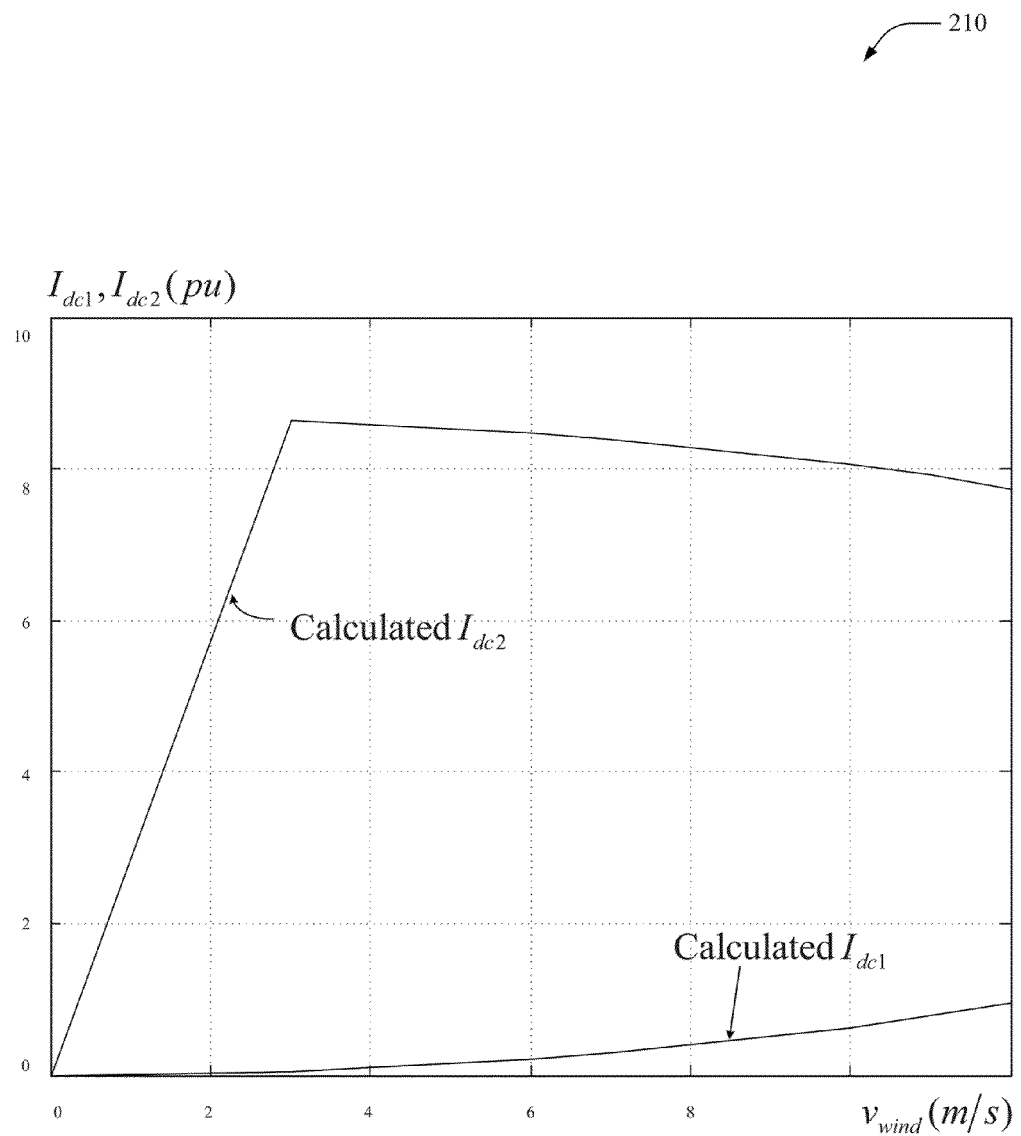
FIG. 2B illustrates a graph that depicts the dc-link current output by the diode rectifier.

Referring to FIG. 2B, there illustrated is a graph that depicts the dc-link current for the diode rectifier 202. As seen, the values of $I_{dc1}$ and $I_{dc2}$ can vary with system parameters. For example, $I_{dc1}$ can normally be in the range of 0~1.5 pu whereas $I_{dc2}$ can be much higher than 2 pu. Moreover, a high value of $I_{dc2}$ can lead to an unreasonable dc-link current that does not satisfy its prerequisite given in equation (2). Thus, $I_{dc1}$ is the only solution for the circuit.

Figure 3:
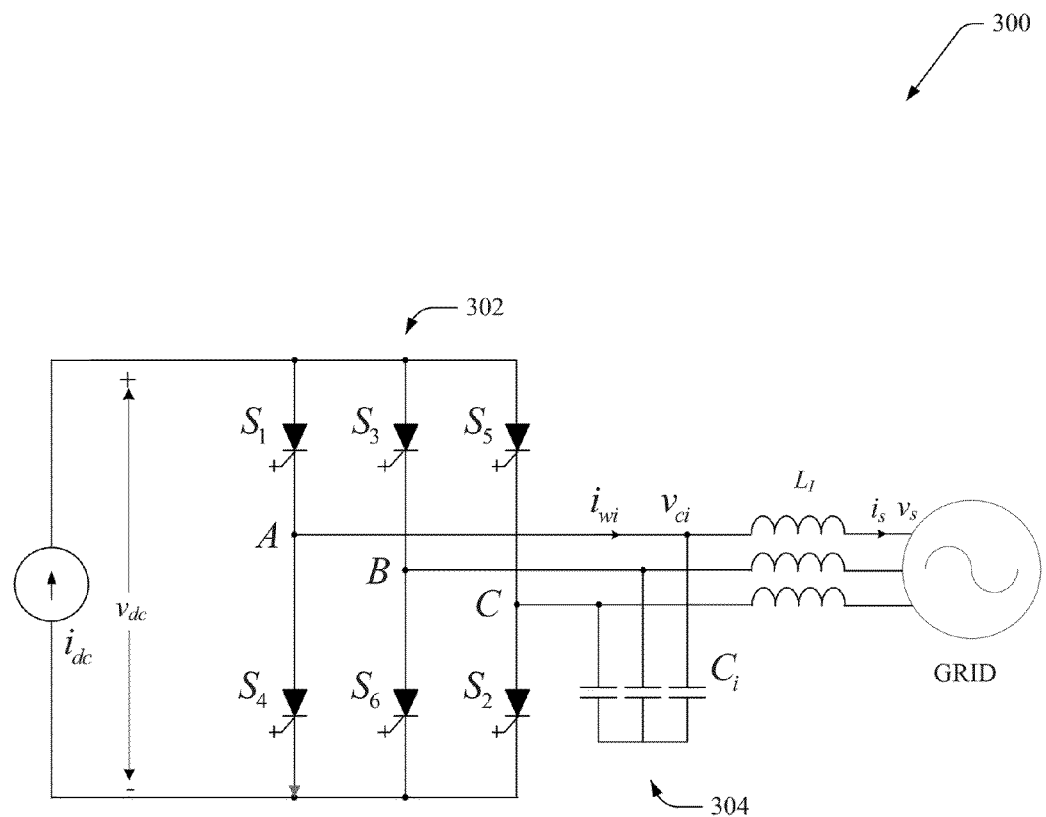
FIG. 3 illustrates an example grid-side converter circuit that employs a pulse width modulation (PWM) current source inverter (CSI).

Referring now to FIG. 3, illustrates an example grid-side converter circuit 300 that employs a PWM current source inverter (CSI) 302 to facilitate power conversion, according to an aspect of the subject innovation. In one embodiment, the CSI 302 can include six reverse-blocking active power devices ($S_1$ to $S_6$) that are fed by a dc current source ($I_{dc}$). In one aspect, $I_{dc}$ can be obtained from a generator-side converter, for example, a circuit connected to a PMSG that comprises a diode and/or thyristor rectifier. In addition the $I_{dc}$ generated by the generator-side converter can be passed through a dc-link circuit prior to receiving the $I_{dc}$ at CSI 302.

According to an aspect, the devices $S_1$ to $S_6$ can be arbitrarily turned on and off by the applied gating signals. Further, the PWM CSI 302 can employ a three-phase capacitor $C_i$ 304 at its output to assist current commutation and filter harmonics. Moreover, as seen from the figure, the topology 300 has several prominent features such as simple structure, well defined current waveforms, smoothed voltage waveforms, controllable power factor and/or reliable short circuit protection. The steady-state grid-side and dc-link voltages and currents can be related by, $$I_{wi}=m_{ai}I_{dc} \qquad (9)$$

$$V_{dc}=m_{ai}V_{ci}\cos\alpha_i \qquad (10)$$

Where $m_{ai}$ and $\alpha_i$ are the converter modulation index and delay angle, respectively.

The active switching devices $S_1$ to $S_6$ employed in the PWM CSI 302 can offer two freedoms for converter control. Both $m_{ai}$ and the absolute value of $\cos\alpha_i$ can typically be in the range of [0, 1], hence, the ac current magnitude $I_{wi}$ can be equal to or less than that of the dc-link current $I_{dc}$. Conversely, the average dc-link voltage $V_{dc}$ will not be higher than the ac voltage $V_{ci}$. In order to maintain proper operation at the grid-side, the dc-link current has to be above a minimum required level, which can be determined by the active and reactive power control objectives on the grid-side.

Figure 4A:
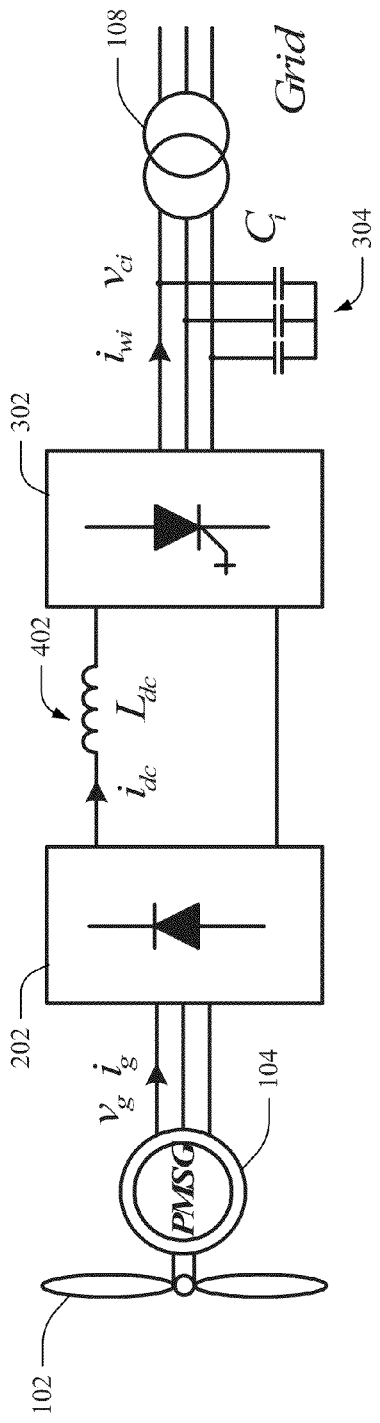
FIG. 4A illustrates an example system for wind energy conversion that utilizes a diode rectifier and PWM CSI.

Referring now to FIG. 4A, there illustrated is an example system 400 for wind energy conversion that utilizes a diode rectifier 202 and PWM CSI 302. In particular, system 400 includes the diode rectifier 202 as a generator-side converter and the PWM CSI 302 as the grid-side converter. The two converters (202, 302) can be interconnected through a dc inductor 402. Moreover, the dc inductor can include an inductance of most any value $L_{dc}$. It can be appreciated that the wind turbine 102, generator 104, diode rectifier 202, CSI 302 and the three-phase capacitor C, 304 can include functionality, as more fully described herein, for example, with regard to systems 100, 200 and 300.

In one aspect, the generator 104, for example a PMSG, can generate a three-phase alternating current (AC) $i_g$ by converting the kinetic energy of the wind turbine 102 into electric energy. Further, the diode rectifier 202, inputs $i_g$ and generates a dc current $i_{dc}$. It can be appreciated that the bridge rectifiers (diode and/or thyristor) disclosed herein are not limited to single-phase designs. In most industrial control systems, AC power is available in three-phase form for maximum efficiency, and solid-state control circuits are built to take advantage of that.

The dc current $i_{dc}$ generated by the diode rectifier 202 can be passed through the dc inductor 402 prior to the PWM CSI 302, which generates the output current $i_{wi}$ for the grid 108. Moreover, the $I_{dc}$ inductor can include an inductance of most any value $L_{dc}$. In one aspect, the dc-link current $I_{dc}$ can be equal to the value corresponding to the maximum power point, to ensure MPPT operation of the generator 104. Additionally or alternately, the dc-link current $I_{dc}$ can be above a minimum value that satisfies active and reactive power control requirements on the grid-side. If the control objectives on both generator and grid sides are to be achieved simultaneously, the generator-side dc-link current $I_{dc}$ determined by the MPPT can be higher than the minimum level required by the grid-side.

Since the generator-side converter utilizes a diode rectifier 202 that comprises diodes, which are less expensive than active switching devices, the cost of the system 400 can be reduced. In addition, system 400 provides a simplified rectifier-side control wherein a gating signal is not required for diode rectifier 202.

Figure 4B:
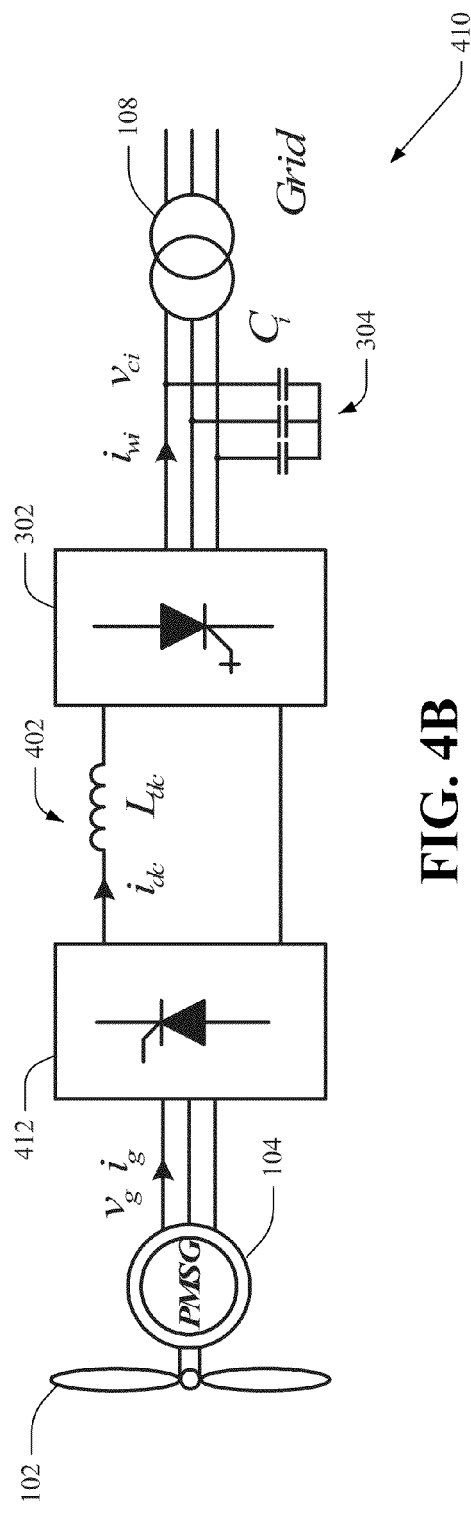
FIG. 4B illustrates an example system for power conversion that utilizes a topology comprising a phase-controlled thyristor rectifier and PWM CSI in accordance with an aspect of the subject disclosure.

FIG. 4B illustrates an example system 410 for power conversion that utilizes an alternate topology, which thyristor rectifier 412 and PWM CSI 302 to facilitate power generation in accordance with an aspect of the subject disclosure. In particular, system 410 includes the phase-controlled thyristor rectifier 412 as a generator-side converter and the PWM CSI 302 as the grid-side converter, which are interconnected through a dc inductor 402. Moreover, the dc inductor can include an inductance of most any value $L_{dc}$. It can be appreciated that the wind turbine 102, generator 104, diode rectifier 202, CSI 302, the three-phase capacitor $C_i$ 304 and dc inductor 402 can include functionality, as more fully described herein, for example, with regard to systems 100, 200, 300 and 400.

In one aspect, the generator 104, for example a PMSG, can generate a three-phase ac current $i_g$ by converting the kinetic energy of the wind turbine 102 into electric energy. The system 410 is operable to convert input electrical power from the input source (e.g., generator 104) to output electrical power provided to the power grid 108. In this example, the AC input power is switched by a first set of thyristor switches, forming a thyristor rectifier 412, constituting the generator-side converter. Moreover, the thyristor rectifier 412 can create an intermediate DC bus current $I_{dc}$ in the intermediate circuit. The grid-side CSI 302 comprises a set of switches, implemented utilizing active devices (with gating current), forming a CSI switching inverter stage 302 that selectively switches the dc power from the intermediate circuit to provide multiphase AC output power to the grid 108. In particular, the intermediate circuit can include a dc inductor 402 linking the switches of the thyristor rectifier 412 and the CSI 302 and provides forward (or positive) current path between the converters. Although, it can be appreciated that most any other forms and types of intermediate circuit storage elements may be employed within the scope of the subject disclosure.

With respect to both systems 400 and 410, it can be appreciated that the switching devices SI-S6 of CSI 302 (shown in detail in FIG. 3) can be any suitable controllable electrical switch types, such as, but not limited to Integrated Gate-Commutated Thyristors (IGCTs), gate turn off thyristors (GTOs), insulated gate bipolar transistors (IGBTs) etc., that are controlled according to any suitable type or form of switching scheme or schemes, such as phase control, pulse width modulation, etc., in open or closed-loop fashion. Optionally, systems 410 (and/or 400) can include output grid capacitors $C_i$, wye-connected or delta-connected, to the output lines.

Figure 5:
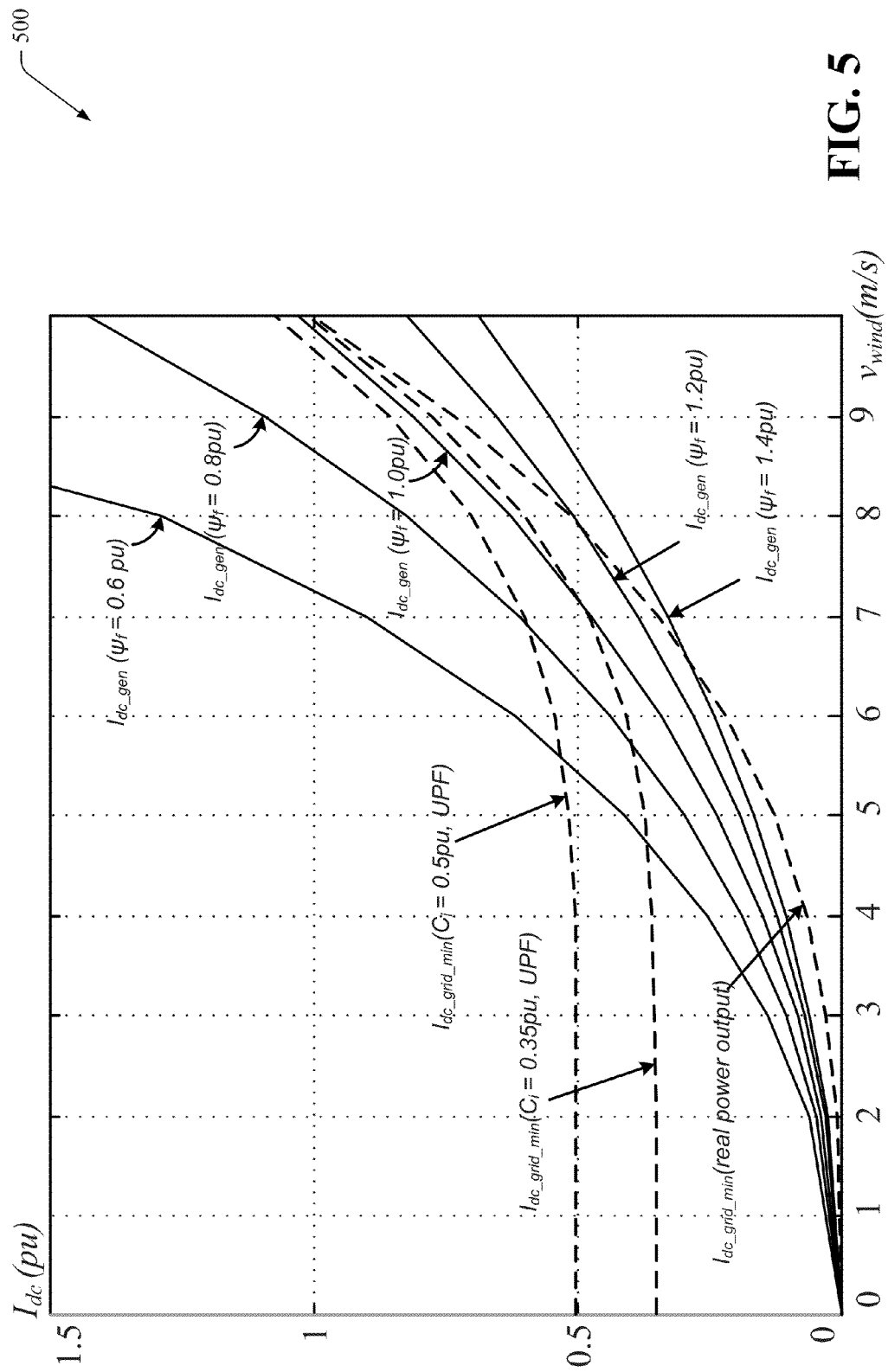
FIG. 5 illustrates an example graph that depicts dc current requirements for a diode rectifier with PWM CSI.
Figure 6A:
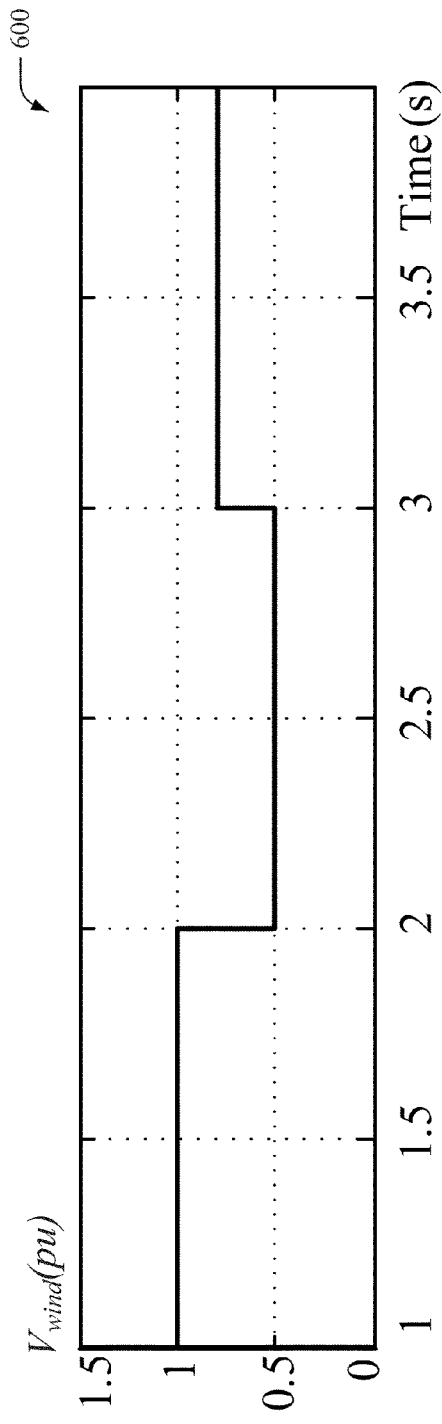
FIGS. 6A-6D illustrate example waveforms for a WECS that employs a diode rectifier with PWM CSI for power conversion.
Figure 6B:
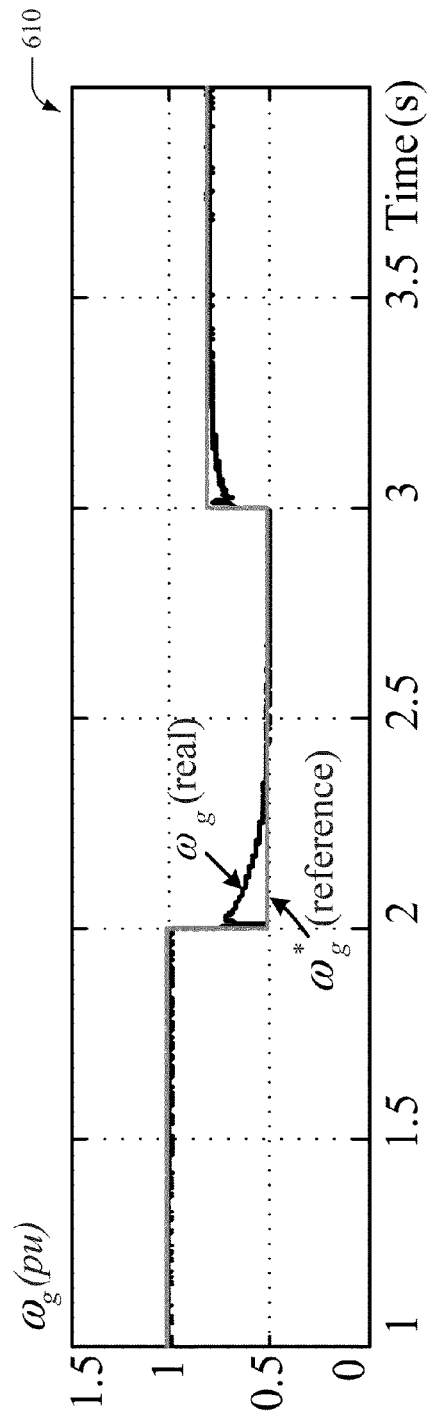
Figure 6C:
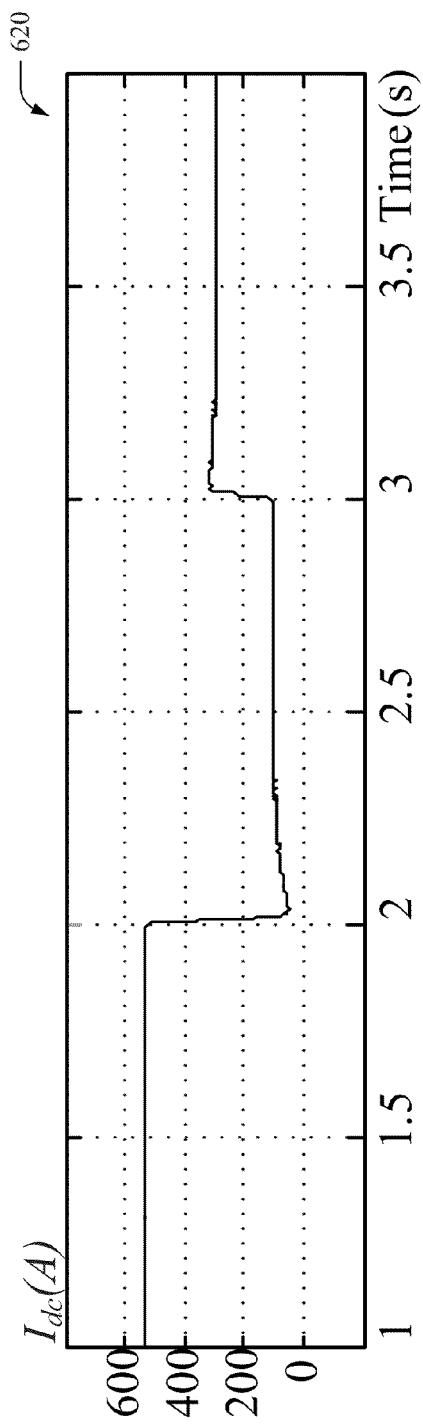
Figure 6D:
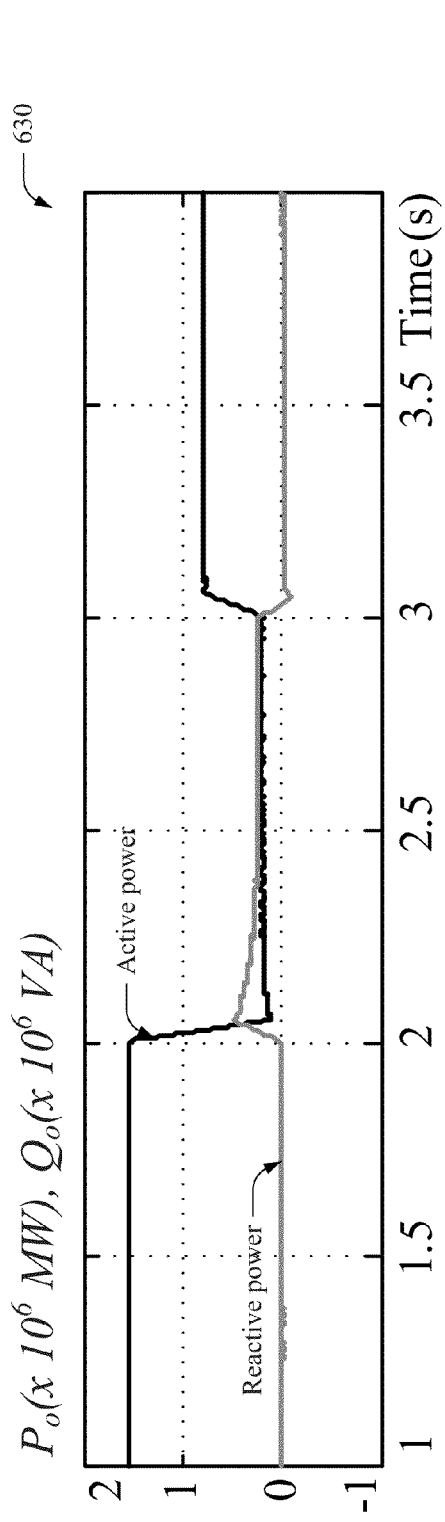

Referring now to FIG. 5, there illustrated is an example graph 500 that depicts dc current requirements for diode rectifier with PWM CSI in accordance with an aspect of the subject innovation. Moreover, graph 500 provides the dc-link current requirements from both sides in respect of the wind speed, under the assumption that the maximum power is delivered to the grid. The ac capacitor $C_i$ (e.g., valued at 0.35 pu) at the output of the CSI (302) absorbs considerable amount of leading current which needs to be compensated by the converter if unity power factor (UPF) is desired at the grid connection point. The minimum grid-side dc-link current requirements, $I_{dc\_grid\_min}$, are shown as dashed lines for two operating modes: UPF mode and real power output mode without controlling reactive power. In the low wind speed region (e.g., 0~6 m/s), the real power extracted from the turbine is relatively low and $I_{dc\_grid\_min}$ for UPF is mainly determined by the reactive current in the capacitors, resulting in almost constant values. When the wind speed increases, the value of $I_{dc\_grid\_min}$ also rises due to the increase in active current. The other five curves in solid lines illustrate the operating dc-link current $I_{dc\_gen}$ for MPPT at the generator-side.

The curves are given for different magnetic flux, ranging from 0.6 pu to 1.4 pu. It is reasonable that when the generator (104) terminal voltage drops as the magnetic flux reduces, $I_{dc\_gen}$ curves are raised accordingly such that the same amount of power at the dc-link is obtained. Taking the case of 1.0 pu magnetic flux as an example, the system can ensure grid-side UPF operation in the wind speed range from 9 m/s to 12.5 m/s where $I_{dc\_gen} > I_{dc\_grid\_min}$. For example, if the wind speed is lower than 9 m/s, the generator-side dc-link current drops below the minimum requirement from the grid-side. Although MPPT operation is still achievable, the grid-side power factor can no longer be maintained at unity. In order to retrieve the grid-side UPF control in the range of half to full rated wind speed, the magnetic flux can to be reduced to around 0.6 pu. However, in this case, the dc-link current at rated wind speed is substantially increased. The current ratings of the generator-side (202) and grid-side (302) converters can be increased as well.

Since the voltage-boost characteristic of CSI (302) is naturally in accordance with the wind energy generation system, the CSI offers wider operating ranges. On the contrary, the voltage-buck characteristic of the conventional VSI makes it necessary to increase the source voltage or to add a voltage-boost stage for the proper operation of the system. The additional stage in conventional systems increases the number of components employed, and thus increases cost and complexity.

FIGS. 6A-6D, illustrate example waveforms (610,620,630,640) for a WECS (e.g., a 1.56 MW/3000V/300 A system) that employs diode rectifier with PWM CSI to facilitate power conversion. Although the waveforms (610, 620,630,640) are obtained from, the 1.56 MW/3000V/300 A system, it can be appreciated that the subject disclosure is not so limited and most any system can be utilized. FIGS. 6A-6D show the simulation results for three different wind speeds ($v_{wind}$ shown in 600). In this example, the CSI is switched by space vector modulation and the generator flux is 1 pu. The generator speed ($\omega_g$) curves depicted in 610, demonstrate that the optimum speed reference is well tracked by the real value, which means MPPT is obtained under all three conditions. The converter dc-link current $I_{dc}$, depicted in 620, varies with the wind speed in order to achieve MPPT at the generator-side. Grid-side active ($P_o$) and reactive ($Q_o$) powers are also shown in 630. Rated active power ($P_o$) and UPF are achieved at rated wind speed (12.5 m/s). As the wind speed $v_{wind}$ drops to 6 m/s, the power extracted from the turbine is substantially reduced. In the meantime, due to the limited dc-link current $I_{dc}$ at this speed, grid-side converter is not able to maintain the reactive power ($Q_o$) at zero. As a result the reactive power ($Q_o$) rises slightly. The reactive power ($Q_o$) is again controlled to zero when the wind speed $v_{wind}$ steps up to 9 m/s. In contrast with conventional voltage-buck VSI based topologies, the disclosed PWM CSI has inherent voltage-boost capability and therefore can be well adapted to wind power generation applications.

Referring now to FIGS. 7A-7D, there illustrated are example waveforms (710,720,730,740) for a WECS that employs a phase-controlled thyristor rectifier as a generator-side converter and a PWM CSI as a grid-side converter, during power conversion. In this example, the simulation of the disclosed thyristor rectifier with PWM CSI topology can be carried out on a 1.56 MW/3000V/300 A system. However, most any system can be utilized. Waveform 700 indicates an example delay angle of the thyristor bridge. The generator speed ($\omega_g$) curve is depicted in 710 and the converter dc-link current $I_{dc}$, is depicted in 720, which varies with the wind speed in order to achieve MPPT at the generator-side. Grid-side active ($P_o$) and reactive ($Q_o$) powers are also shown in 730. As seen from 730, reactive power ($Q_o$) is controllable at low speeds by employing a topology that utilizes a thyristor bridge and a PWM CSI by varying the delay angle of the thyristors.

As an example, consider the curve for flux equals to 1 pu illustrated in FIG. 5. The dc-link current requirements of the grid-side converter for real power output are typically below the dc-link current requirement from the generator-side converter. Therefore, the system (e.g., system 400) can ensure full-range real power output to the grid. However, the grid-side power factor (PF) is not guaranteed in this case. The grid-side PWM CSI has a large ac capacitor, which can absorb considerable amount of leading current. The leading current can be compensated by the converter if unity power factor (UPF) is required at the grid connection point. The minimum grid-side dc-link current requirements for UPF operation are also shown in FIG. 5. It can be observed that at low wind speeds, real power flow in the system is low and the grid-side dc-link current minimum requirement is higher than the generator-side dc-link requirement. This means the UPF cannot be achieved at low wind speeds. To enlarge the UPF operating range, the generator-side dc-link current requirements can be increased. In one aspect, a phase-controlled thyristor converter can be employed as the generator-side converter and the delay angle of the converter can be controlled to boost the dc-link current, thus increasing the range of UPF operation of the system. In another aspect, if the generator flux varies from 0.6 pu to 1.4 pu, the generator-side dc-link current requirements are observed to increase. In this example scenario, an electrical excited synchronous generator (EESG) with an additional flux excitation control freedom can also be utilized to enlarge the UPF operating range.

Figure 8:
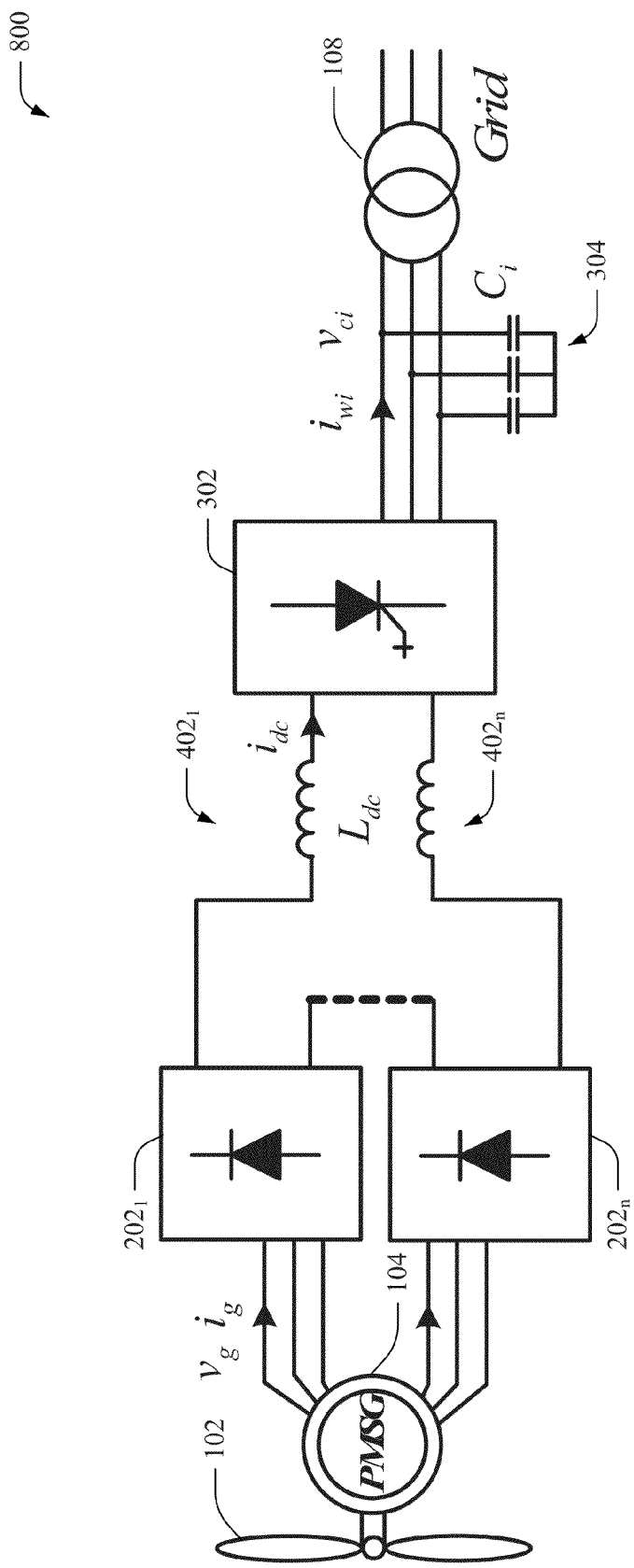
FIG. 8 illustrates an example system that employs a plurality of generator-side converters during power conversion in accordance with an aspect of the subject specification.

Referring now to FIG. 8, there illustrated is an example system 800 that employs a plurality of generator-side converters during power conversion in accordance with an aspect of the subject specification. It can be appreciated that the wind turbine 102, generator 104, CSI 302, the three-phase capacitor $C_i$ 304 and grid 108 can include functionality, as more fully described herein, for example, with regard to systems 100, 200, 300, 400, and 410. In one aspect, system 800 can include a plurality of diode rectifiers $202_1$-$202_n$ (where n can be most any integer from 1 to infinity) on the generator-side that are connected to the output of a generator 104. Each of the diode rectifiers $202_1$-$202_n$ can be substantially similar to diode rectifier 202 (FIG. 2) and can include functionality as more fully described herein, for example, with regard to systems 200 and 400. Moreover, the output of the diode rectifiers $202_1$-$202_n$ can be connected in series and provided to the PWM CSI 302 via inductors $402_1$-$402_n$.

The dc current $i_{dc}$ from the output of the diode rectifiers $202_1$-$202_n$ can be converted into a three-phase ac current with fixed voltage and/or frequency by the PWM CSI 302. The output of the PWM CSI 302 can pass through a three-phase capacitor $C_i$ 304 for current commutation and/or for filtering harmonics prior to providing the output to the grid 108. Although, a plurality of diode rectifiers $202_1$-$202_n$ have been illustrated on the generator-side, it can be appreciated that a plurality of thyristor rectifiers and/or a combination of diode and thyristor rectifiers can be utilized at the generator-side for generating the dc current.

Figure 9:
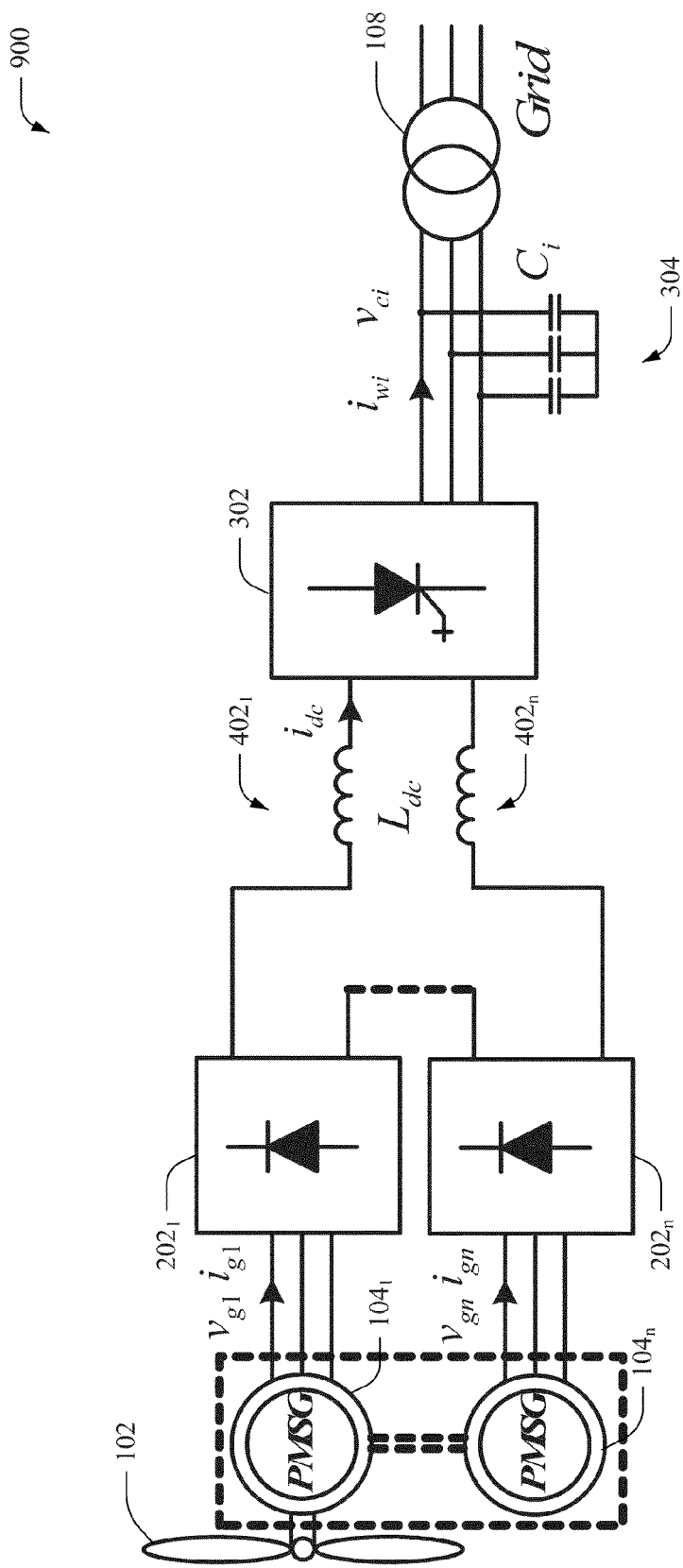
FIG. 9 illustrates an example system that employs a plurality of generators for power generation, according to an aspect of the subject disclosure.

FIG. 9 illustrates an example system 900 that employs a plurality of generators for power generation, according to an aspect of the subject disclosure. In one embodiment, wind turbine 102 (or most any turbine, for example, hydro turbine) can be connected to a plurality of generators $104_1$-$104_n$ (where n can be most any integer from 1 to infinity). As an example, the generators $104_1$-$104_n$ can be PMSGs and can be substantially similar to generator 104 (FIG. 1). Moreover, the generators $104_1$-$104_n$ can convert kinetic energy from the wind turbine 102 into electric energy (e.g., three-phase current). It can be appreciated that the wind turbine 102, CSI 302, the three-phase capacitor $C_i$ 304, diode rectifiers $202_1$-$202_n$, dc links $402_1$-$402_n$ and grid 108 can include functionality, as more fully described herein, for example, with regard to systems 100, 200, 300, 400, 410 and 800.

Further, the generators $104_1$-$104_n$ can provide the generated electric energy to respective diode rectifiers $202_1$-$202_n$. It can be appreciated that a plurality of thyristor rectifiers and/or a combination of diode and thyristor rectifiers can also be utilized (not shown). The diode rectifiers $202_1$-$202_n$ can be connected in series and can generate dc current $i_{dc}$. A dc-link, which includes inductance $L_{dc}$ can be utilized to connect the diode rectifiers $202_1$-$202_n$ to the CSI 302. The CSI 302 converts the dc current $i_{dc}$ to a three-phase ac current with fixed voltage and/or frequency, which is then filtered by a three-phase capacitor $C_i$ prior to providing the output to the utility grid 108.

Figure 10:
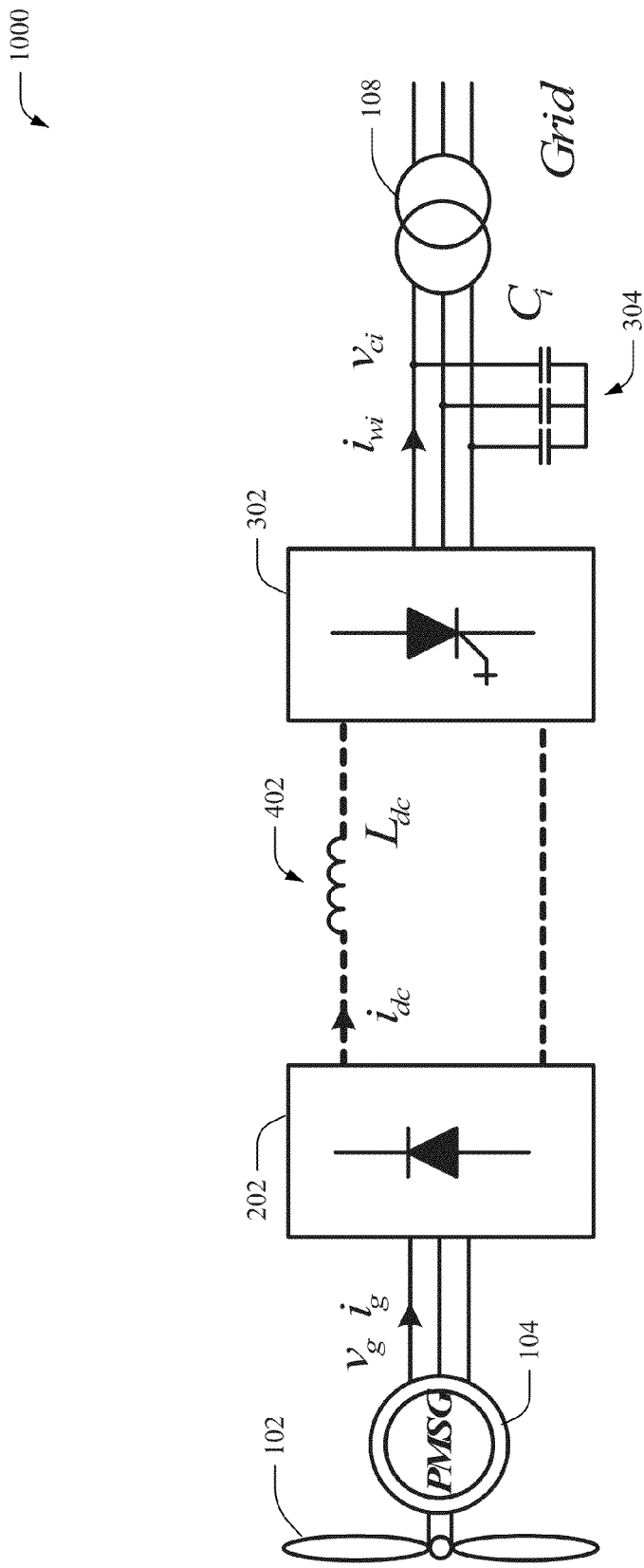
FIG. 10 illustrates an example system for power generation in long cable applications.

FIG. 10 illustrates an example system 1000 for power generation in long cable applications. It can be appreciated that the wind turbine 102, generator 104, CSI 302, the three-phase capacitor $C_i$ 304 and grid 108 can include functionality, as more fully described herein, for example, with regard to systems 100, 200, 300, 400, and 410. Typically, variable frequency and/or variable voltage is generated at machine generator-side by generator 104. In contrast, the voltage at the grid-side is fixed voltage and in one example, the grid-side voltage is generally higher than the generated voltage ($v_g$).

A diode rectifier 202 or thyristor bridge (not shown) can be utilized to convert the generated electric energy into a dc current. In one aspect, the diode rectifier 202 can be connected to the CSI 302 via a long cable, such that, the diode rectifier 202 resides close to generator 104 and the CSI 302 resides further away from the generator 104, for example, close to the utility grid 108. Moreover, the cable link (depicted by dashed lines) can include at least part of the inductance needed in the dc link 402. At the CSI 302, the dc current is converted to a three-phase ac current with fixed voltage and/or frequency, which is then filtered by a three-phase capacitor $C_i$ and delivered to the utility grid 108.

Figure 11:
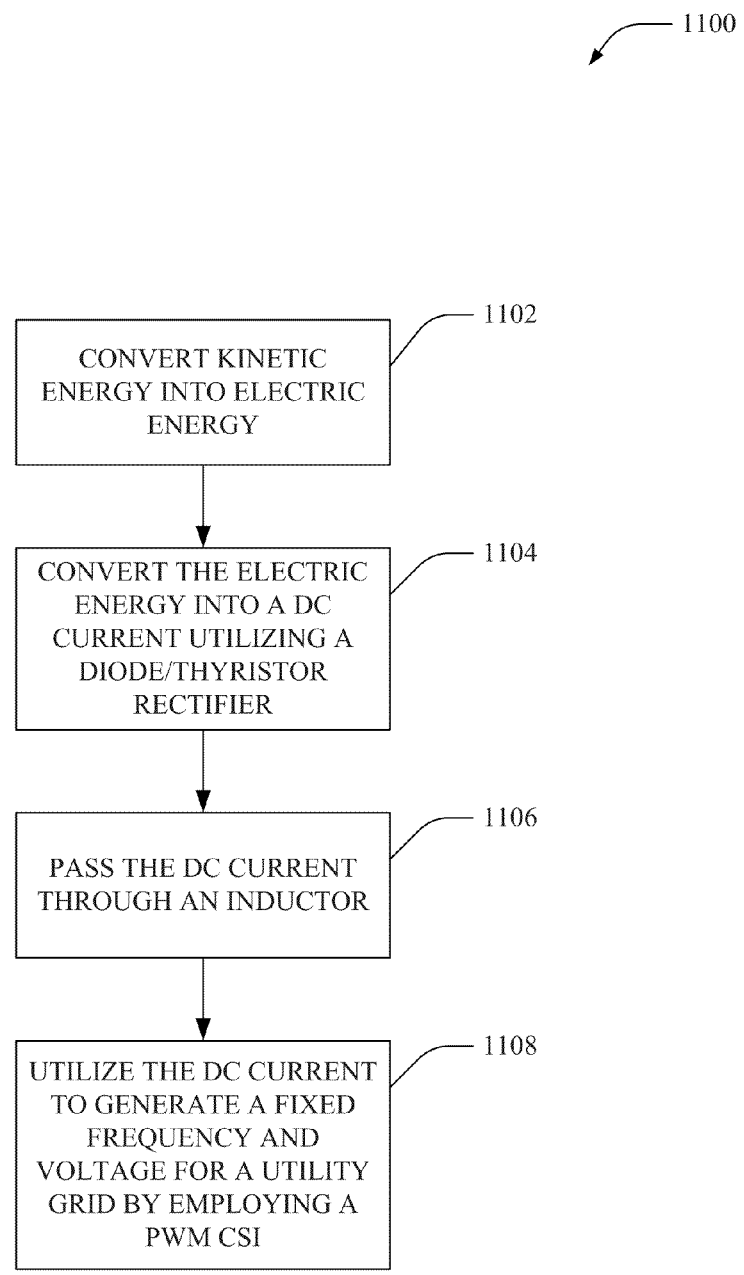
FIG. 11 illustrates an example low cost methodology for power generation applications.

FIG. 11 illustrates a methodology in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 11, which illustrates an example low cost methodology 1100 for power generation applications. At 1102, kinetic energy can be converted to electric energy, for example, by a generator (e.g., PMSG). In one aspect, kinetic energy can be obtained from most any source, such as, but not limited to a wind turbine, hydro turbine, etc. At 1104, the electric energy can be converted to a dc current by employing a diode rectifier, a thyristor rectifier and/or a combination thereof.

At 1106, the dc current can be passed through a dc link. As an example, the dc link can comprise an inductor and/or a long cable that provides at least part of the inductance of the dc link. At 1108, the dc current can be utilized to generate a fixed frequency and/or voltage for a utility grid, by employing a CSI, for example, a PWM CSI. Optionally, a three phase capacitor can be employed to assist current commutation and filter harmonics prior to delivering the ac current to the utility grid.

The aforementioned systems/circuits have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

The components and circuitry elements described above can be of any suitable value in order to implement the embodiments of the present invention. For example, the diodes can include most any performance characteristics; inductors can provide any suitable inductance, etc. What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims.

Further, to the extent that the term "includes" is used in either the detailed description or the claims, such term is intended to be inclusive in a manner similar to the term "comprising" as "comprising" is interpreted when employed as a transitional word in a claim. In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, no single embodiment shall be considered limiting, but rather the various embodiments and their equivalents should be construed consistently with the breadth, spirit and scope in accordance with the appended claims.

What is claimed is:

1. A system, comprising:
   a first generator-side converter circuit comprising a first diode bridge and coupled in series with a second generator-side converter circuit comprising a second diode bridge,
   wherein the first generator-side converter circuit is coupled to a first generator of a set of generators that is coupled to a turbine and the second generator-side converter circuit is coupled to a second generator of the set of generators, the first generator and the second generator convert kinetic energy generated by the turbine to an electrical energy signal, and the first generator-side converter circuit and the second generator-side converter circuit receive the electrical energy signal and output a direct current signal based on the electrical energy signal; and
   a grid-side converter circuit, coupled to outputs of the first generator-side converter circuit and the second generator-side converter circuit via a direct current link, comprising a current source inverter circuit that converts the direct current signal to a three-phase alternating current signal, wherein a direct current link voltage is varied to control the first generator-side converter circuit and the second generator-side converter circuit to facilitate an increase in power received from the set of generators.

2. The system of claim 1, wherein the current source inverter circuit comprises a thyristor bridge that receives a gating current signal that controls a thyristor of the thyristor bridge.

3. The system of claim 1, wherein the current source inverter is a pulse width modulated current source inverter.

4. The system of claim 1, wherein, the direct current link comprises an inductor.

5. The system of claim 1, wherein, the direct current link comprises a cable that is determined to satisfy a length criterion.

6. The system of claim 1, wherein the first generator of the set of generators is an electrical excited synchronous generator.

7. The system of claim 1, wherein the first generator of the set of generators is a permanent magnet synchronous generator.

8. The system of claim 1, wherein the three-phase alternating current signal is directed to a utility grid circuit.

9. The system of claim 8, further comprising:
   a three phase capacitor coupled to an output of the grid-side converter circuit that facilitates filtering a harmonic frequency prior to directing the three-phase alternating current signal to the utility grid.

10. The system of claim 1, wherein the turbine comprises a hydro turbine.

11. The system of claim 1, wherein the direct current signal that passes through the direct current link is adjusted based on control objective information.

12. The system of claim 1, wherein the turbine comprises a wind turbine.

13. The system of claim 1, wherein the first generator-side converter circuit and the second generator-side converter circuit are coupled in series with a third generator-side converter circuit comprising a thyristor bridge, and an output signal from the third generator-side converter circuit is provided to the grid-side converter circuit.

14. A method, comprising:
   receiving, by an interconnection circuit, an electrical signal via a set of generators coupled to a turbine that convert kinetic energy generated by the turbine to the electrical signal;
   converting, by the interconnection circuit, the electrical signal to a direct current signal by employing a first diode bridge circuit coupled to a first generator of the set of generators and a second diode bridge circuit coupled to a second generator of the set of generators, wherein the first diode bridge circuit and the second diode bridge circuit are coupled in series; and
   directing, by the interconnection circuit, the direct current signal to a current source inverter circuit via a direct current link to facilitate a conversion of the direct current signal to a three-phase alternating current signal, wherein a voltage across the direct current link is adjusted to control the first diode bridge circuit and the second diode bridge converter circuit and facilitate an increase in power received from the set of generators.

15. The method of claim 14, wherein the receiving comprises receiving the electrical signal from the set of generator that is coupled to a wind turbine.

16. The method of claim 14, wherein the receiving comprises receiving the electrical signal from the set of generators that is coupled to a hydro turbine.

17. The method of claim 14, wherein the converting comprises converting the electrical signal to the direct current signal by employing a thyristor bridge circuit coupled in series with the first diode bridge circuit and the second diode bridge circuit.

18. The method of claim 14, wherein the directing comprises directing the direct current signal to a pulse width modulated current source inverter circuit.

19. A method, comprising:
   converting, by a set of generators, kinetic energy generated by a turbine into an electrical energy signal; and
   providing the electrical energy signal to a current source inverter circuit via a first diode bridge circuit and a second diode bridge circuit that are coupled in series to facilitate a generation of a three-phase alternating current signal, wherein the first diode bridge circuit is coupled to a first generator of the set of generators and the second diode bridge circuit is coupled to a second generator of the set of generators and wherein the voltage across a direct current link that couples the first diode bridge circuit and the second diode bridge circuit to the current source inverter circuit is modified to control a power signal provided by the set of generators.

20. The method of claim 19, wherein the converting comprises converting, to the electrical energy signal, the kinetic energy generated by a hydro turbine.

* * * * *